United States Patent
Lee et al.

(10) Patent No.: US 7,690,365 B2
(45) Date of Patent: Apr. 6, 2010

(54) FUEL GAS SUPPLY SYSTEM AND METHOD OF AN LNG CARRIER

(75) Inventors: Jung Han Lee, Geoje-si (KR); Dong Kyu Choi, Geoje-si (KR); Hyun Ki Park, Geoje-si (KR)

(73) Assignee: Daewoo Shipbuilding & Marine Engineering Co., Ltd., Seoul (KR)

( * ) Notice: Subject to any disclaimer, the term of this patent is extended or adjusted under 35 U.S.C. 154(b) by 0 days.

(21) Appl. No.: 12/332,733

(22) Filed: Dec. 11, 2008

(65) Prior Publication Data

US 2009/0126704 A1   May 21, 2009

Related U.S. Application Data

(63) Continuation of application No. 12/028,207, filed on Feb. 8, 2008.

(30) Foreign Application Priority Data

May 8, 2007   (KR) ..................... 10-2007-0044727

(51) Int. Cl.
F02B 43/00   (2006.01)
(52) U.S. Cl. .................. 123/527; 123/27 GE
(58) Field of Classification Search ............. 123/27 GE, 123/527
See application file for complete search history.

(56) References Cited

U.S. PATENT DOCUMENTS

| | | | | |
|---|---|---|---|---|
| 3,630,042 | A * | 12/1971 | Petsinger | ................. 62/532 |
| 3,857,245 | A | 12/1974 | Jones | |
| 4,742,801 | A * | 5/1988 | Kelgard | .................. 123/27 GE |
| 5,586,513 | A | 12/1996 | Jean et al. | |
| 6,035,795 | A | 3/2000 | Dhellemmes et al. | |
| 6,378,722 | B1 | 4/2002 | Dhellemmes | |
| 6,659,730 | B2 * | 12/2003 | Gram et al. | ................... 417/53 |
| 6,663,350 | B2 * | 12/2003 | Tyree, Jr. | ..................... 417/53 |
| 6,698,211 | B2 * | 3/2004 | Gustafson | .................. 62/50.2 |
| 6,745,576 | B1 | 6/2004 | Granger | |
| 7,308,889 | B2 * | 12/2007 | Post et al. | ................... 123/527 |
| 2001/0042377 | A1 | 11/2001 | Pozivil | |
| 2003/0000949 | A1 | 1/2003 | Dhellemmes | |
| 2006/0086412 | A1 | 4/2006 | Spittael et al. | |

FOREIGN PATENT DOCUMENTS

| | | |
|---|---|---|
| EP | 1348620 A1 | 10/2003 |
| EP | 1898143 A2 | 3/2008 |
| GB | 1440318 | 6/1976 |
| JP | 6336193 A | 12/1994 |
| JP | 2003227608 A | 8/2003 |
| KR | 20000011346 | 2/2000 |

(Continued)

*Primary Examiner*—Noah Kamen
(74) *Attorney, Agent, or Firm*—Seed IP Law Group PLLC

(57) ABSTRACT

A fuel gas supply system of a vessel, such as an LNG carrier, is provided for supplying fuel gas to a high-pressure gas injection engine of an LNG carrier, wherein LNG is extracted from an LNG storage tank of the LNG carrier, compressed at a high pressure, gasified, and then supplied to the high-pressure gas injection engine. In one embodiment, the system is operated to supply fuel to an MEGI engine.

4 Claims, 3 Drawing Sheets

FOREIGN PATENT DOCUMENTS

| | | |
|---|---|---|
| KR | 20000011347 | 2/2000 |
| KR | 20030073975 A | 9/2003 |
| KR | 100499710 B1 | 6/2005 |
| KR | 100644217 B1 | 11/2006 |
| WO | 9732157 A1 | 9/1997 |
| WO | 2005045337 A1 | 5/2005 |

* cited by examiner

FUEL GAS SUPPLY SYSTEM AND METHOD OF AN LNG CARRIER

CROSS-REFERENCE TO RELATED APPLICATION

This application is a continuation of U.S. patent application No. 12/028,207, filed Feb. 8, 2008, now pending, which claims priority to Korean Patent Application No. 10 -2007-0044727 filed May 8, 2007 which are incorporated herein by reference in their entireties.

BACKGROUND

1. Technical Field

The present invention relates to a fuel gas supply system and method of a vessel, such as an LNG carrier, and more particularly, to a fuel gas supply system and method of an LNG carrier for efficiently supplying fuel gas from an LNG storage tank to a high-pressure gas injection engine in the LNG carrier.

2. Description of the Related Art

Generally, natural gas is turned into a liquefied natural gas (hereinafter called "LNG") at a cryogenic temperature in a liquefaction plant, and then transported over long distances to a destination by an LNG carrier.

As liquefaction of natural gas occurs at a cryogenic temperature of −163 degrees Celsius at ambient pressure, LNG is likely to be vaporized even when the temperature of the LNG is slightly higher than −163 degrees Celsius at ambient pressure. In an LNG carrier having an LNG storage tank which is thermally-insulated, as heat is continually transmitted from the outside to the LNG in the LNG storage tank, the LNG is continually vaporized and boil-off gas is generated in the LNG storage tank during the transportation of LNG by the LNG carrier.

In an LNG carrier, if boil-off gas is accumulated in an LNG storage tank, the pressure in the LNG storage tank excessively increases. Consequently, to treat the boil-off gas generated in the LNG storage tank, the boil-off gas is used as a fuel for a ship propulsion engine or burned in a gas combustor.

In case where a high-pressure gas injection engine, for example, MEGI engine manufactured by MAN B&W Diesel Inc., is used as a ship propulsion engine of an LNG carrier, a multi-stage compressor is used in a conventional fuel gas supply system to compress boil-off gas at a high pressure. This multi-stage compression has problems that the fuel gas supply system becomes very complex, and that an excessive amount of power is required to compress the boil-off gas in a gaseous state at a high pressure.

BRIEF SUMMARY

According to one embodiment, a fuel gas supply system and method of an LNG carrier are provided, which can simplify the configuration, reduce power requirements, and prevent an excessive pressure increase due to accumulation of boil-off gas in an LNG storage tank, in supplying fuel gas to a high-pressure gas injection engine of an LNG carrier.

A fuel gas supply system of a vessel according to one embodiment is characterized in that the fuel gas supply system of the vessel comprises an LNG tank; MEGI engine as high-pressure gas injection engine; a high-pressure pump for compressing LNG at a high pressure and supplying the compressed LNG to the MEGI engine; and an apparatus to gasify the LNG installed downstream of the high-pressure pump, to gasify the compressed LNG.

A fuel gas supply method of a vessel according to one embodiment, as a method for supplying fuel gas to MEGI engine of the ship, is characterized in that fuel gas supply method of the vessel comprises compressing LNG to meet the pressure requirements for the MEGI engine; gasifying the compressed LNG; and supplying the gasified LNG to the MEGI engine.

DETAILED DESCRIPTION

Preferred embodiments will be described in detail below with references to the accompanying drawings.

Figure 1:
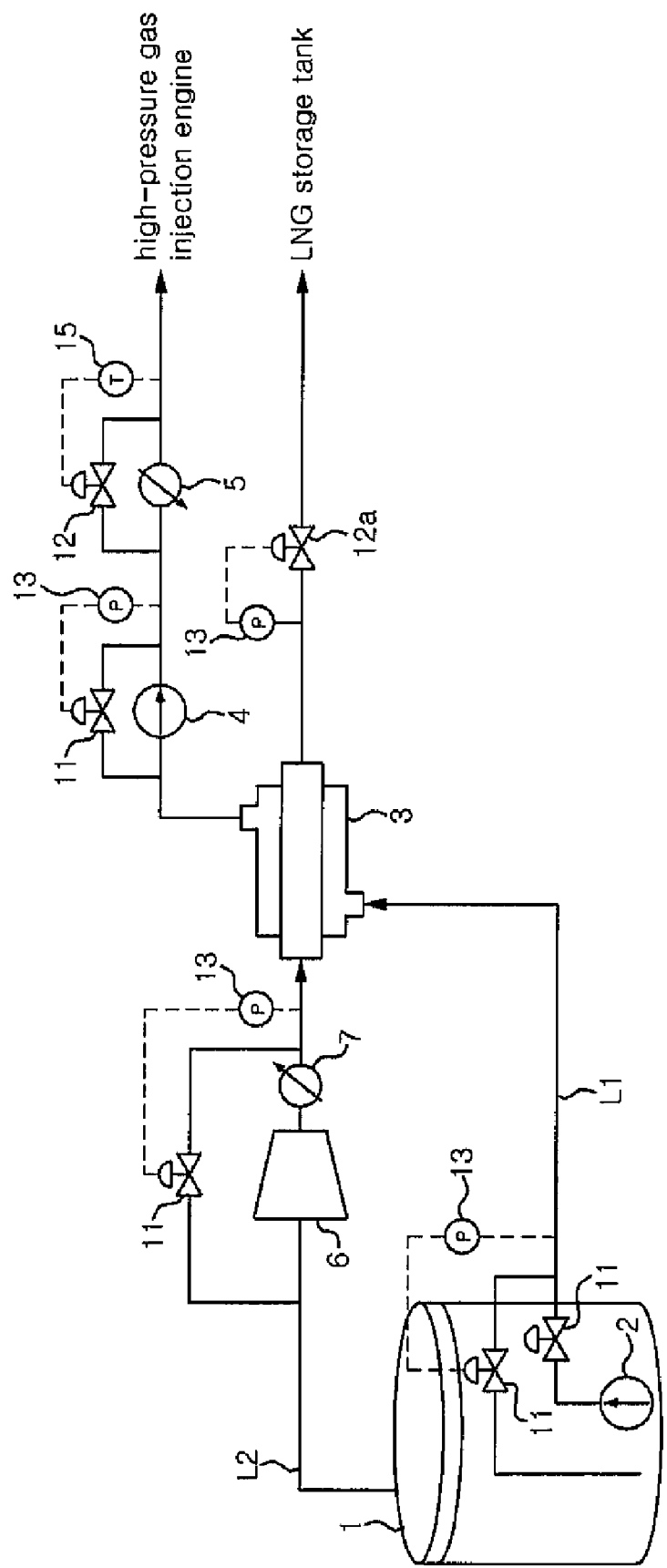
FIG. 1 is a schematic view of a fuel gas supply system of an LNG carrier according to one embodiment.

FIG. 1 is a schematic view of a fuel gas supply system of an LNG carrier according to an embodiment. As illustrated in FIG. 1, the fuel gas supply system of an LNG carrier is to supply fuel gas to a high-pressure gas injection engine of an LNG carrier.

The fuel gas supply system of FIG. 1 includes a fuel gas supply line L1 for supplying LNG extracted from an LNG storage tank 1 of an LNG carrier to a high-pressure gas injection engine of the LNG carrier, and a heat exchanger 3 installed in the middle of the fuel gas supply line L1 so as to exchange heat between LNG and boil-off gas extracted from the LNG storage tank 1.

The fuel gas supply line L1 upstream of the heat exchanger 3 has a first pump 2 for compressing the LNG to meet the pressure requirements for the high-pressure gas injection engine and supplying the LNG toward the high-pressure gas injection engine. According to this embodiment, the first pump 2 is illustrated as installed in the LNG storage tank, but may be installed in the fuel gas supply line L1 upstream of the heat exchanger 3 outside the LNG storage tank 1. Also, the first pump 2 may comprise one pump or two pumps.

A boil-off gas liquefaction line is connected from an upper portion of the LNG storage tank 1, passing through the heat exchanger 3, to one side of the LNG storage tank 1. The boil-off gas is extracted from an upper portion of the LNG storage tank 1, passes through the heat exchanger 3, and is returned to one side of the LNG storage tank 1.

In the heat exchanger 3, the LNG exchanges heat with the boil-off gas to increase the temperature of the LNG and then the LNG is supplied toward the high-pressure gas injection engine, and the boil-off gas is liquefied by heat exchange with the LNG and then returned to the LNG storage tank 1. If the boil-off gas in an upper portion of the LNG storage tank 1 is liquefied and returned to a lower portion of the LNG storage tank 1, it can prevent the pressure in the LNG storage tank from excessively increasing due to accumulation of the boil-off gas in the LNG storage tank 1.

In one embodiment, a second pump 4 is installed in the fuel gas supply line L1 downstream of the heat exchanger 3 so as to compress the LNG which has exchanged heat with the boil-off gas to meet the pressure requirements for the high-pressure gas injection engine, and then to supply the compressed LNG to the high-pressure gas injection engine.

A heater 5 is installed in the fuel gas supply line L1 downstream of the second pump 4 so as to heat the LNG which has exchanged heat in the heat exchanger 3, and then to supply the heat exchanged LNG to the high-pressure gas injection engine.

In one embodiment, boil-off gas compressor 6 and a cooler 7 are installed in the boil-off gas liquefaction line L2 upstream of the heat exchanger 3 so as to compress and cool the boil-off gas extracted from the LNG storage tank 1 before the exchange of heat between the boil-off gas and the LNG.

In a case where the high-pressure gas injection engine is, for example, an MEGI engine manufactured and sold by MAN B&W Diesel Inc., the pressure of the fuel gas required for the MEGI engine can range from 200 to 300 bar (gauge pressure), preferably 250 bar (gauge pressure). The LNG is compressed to 27 bar (gauge pressure) in the first pump 2, and the temperature of the LNG increases from approximately −163 degrees Celsius to approximately −100 degrees Celsius while passing through the heat exchanger 3, and the LNG in a liquid state is supplied to the second pump 4 and compressed to approximately 250 bar (gauge pressure) in the second pump 4 (as it is in a supercritical state, there is no division between liquid and gas states), then heated in the heater 5, and then supplied to the high-pressure gas injection engine. In this case, as the pressure of the LNG supplied to the heat exchanger 3 is high, the LNG, though its temperature increases by passing through the heat exchanger, is not gasified.

On the other hand, in case where the high-pressure gas injection engine is, for example, a gas turbine engine, the pressure of fuel gas required for the gas turbine engine can range from 20 to 40 bar (gauge pressure), preferably 30 bar (gauge pressure). The LNG is compressed to 30 bar (gauge pressure) in the first pump 2, and part of the LNG is gasified while passing through the heat exchanger 3, supplied to the heater 5 and heated in the heater 5, and then supplied to the high-pressure gas injection engine. In this case, the second pump 4 is not necessary.

Flow rate control-type pressure control valves 11 are installed in the fuel gas supply line L1 at the front and rear of the first pump 2, in the fuel gas supply line L1 at the front and rear of the second pump 4, and in the boil-off gas liquefaction line L2 at the front and rear of the boil-off gas compressor 6 and the cooler 7, so as to control the pressure of the fluid passing through the lines.

Also, flow rate control-type temperature control valves 12 are installed in the fuel gas supply line L1 at the front and rear of the heater 5 so as to control the temperature of the fluid passing though the line.

Pressure sensors 13 are connected between the fuel gas supply line L1 at a rear end of the first pump 2, the fuel gas supply line L1 at a rear end of the second pump 4, the boil-off gas liquefaction line L2 at a rear end of the boil-off gas compressor 6 and the cooler 7, and the pressure control valves 11. Also, temperature sensors 15 are connected between the fuel gas supply line L1 at a rear end of the heater 5 and the temperature control valves 12.

The flow rate control-type pressure control valves 11 and temperature control valve 12 control the flow rate, thereby controlling the pressure or temperature of the fluid passing through themselves.

Also, an expandable pressure control valve 12a is installed in the middle of the boil-off gas liquefaction line L2 downstream of the heat exchanger 3 so as to control the pressure of the fluid passing through the line L2.

The pressure sensor 13 is connected between the pressure control valve 12a and the boil-off gas liquefaction line L2 at a front end of the pressure control valve 12a installed in the boil-off gas liquefaction line L2 downstream of the heat exchanger 3.

The pressure control valve 12a installed in the boil-off gas liquefaction line L2 downstream of the heat exchanger 3 expands the passing fluid so as to correspond to the pressure which is obtained by adding the pressure of the LNG storage tank 1 to the pressure due to water head of the LNG in the LNG storage tank 1, thereby controlling the pressure, and the temperature of the LNG decreases by the expansion.

Figure 2:
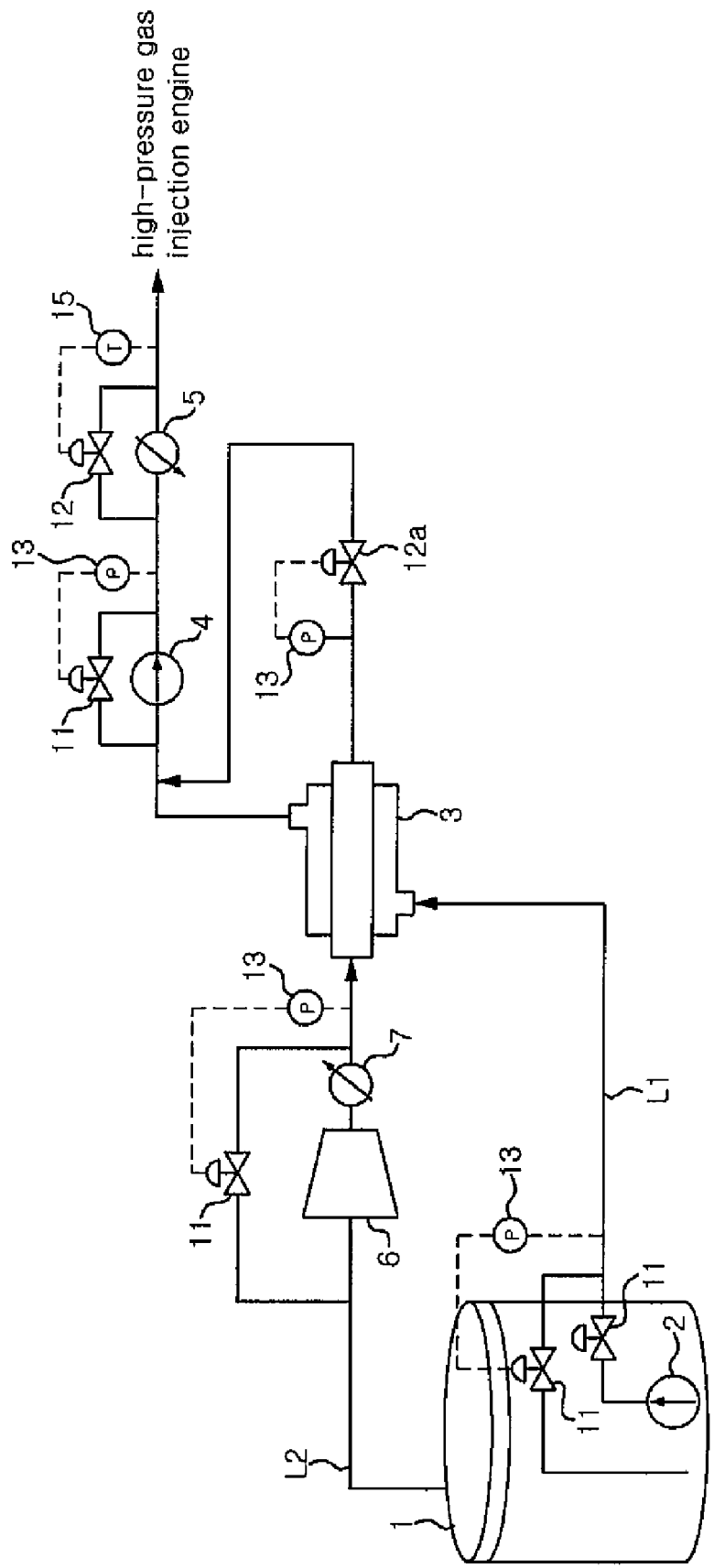
FIG. 2 is a schematic view of a fuel gas supply system of an LNG carrier according to another embodiment.

In one embodiment, as illustrated in FIG. 2, the boil-off liquefaction line L2 may be configured such that it passes through the heat exchanger 3 from an upper portion of the LNG storage tank 1 and is connected between the heat exchanger 3 and the heater 5 in the middle of the fuel gas supply line L1. According to this configuration, boil-off gas is liquefied by heat exchange with the LNG in the heat exchanger 3, compressed in a liquid state, gasified, and then used as fuel gas of the high-pressure gas injection engine. In this case, the pressure control valve 12a installed in the boil-off gas liquefaction line L2 downstream of the heat exchanger 3 controls the pressure of the passing fluid to correspond to the pressure of the LNG in the fuel gas supply line L1.

Figure 3:
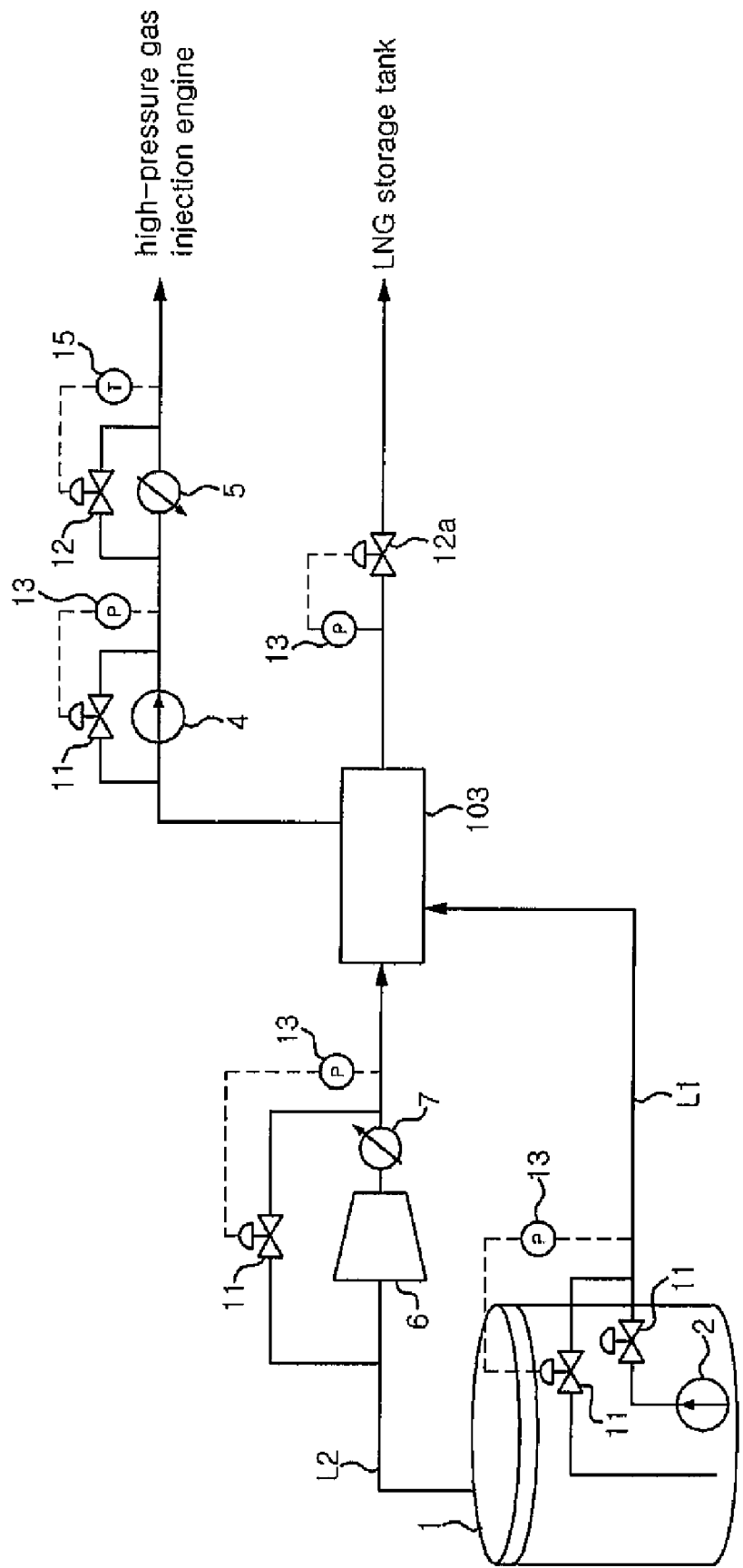
FIG. 3 is a schematic view of a fuel gas supply system of an LNG carrier according to yet another embodiment.

According to the above-mentioned embodiment, the heat exchanger 3 for exchanging heat between the LNG and the boil-off gas extracted from the LNG storage tank 1 is installed in the middle of the fuel gas supply line L1. However, instead of the heat exchanger 3, a recondenser for directly mixing the LNG and the boil-off gas may be installed. According to the embodiment illustrated in FIG. 3, a recondenser 103 instead of a heat exchanger is installed in the fuel gas supply line L1. The boil-off gas liquefaction line L2 for extracting boil-off gas from an upper portion of the LNG storage tank 1 and returning the extracted boil-off gas to one side of the LNG storage tank 1 passes through the recondenser 103 installed in the middle of the fuel gas supply line L1. The recondenser 103 generates condensed LNG by mixing/liquefying the LNG extracted from a lower portion of the LNG storage tank 1 and the boil-off gas extracted from the upper portion of the LNG storage tank 1. The LNG condensed in the recondenser 103 is supplied to the high-pressure gas injection engine through the fuel gas supply line L1, or returned to the LNG storage tank 1 through the boil-off gas liquefaction line L2.

Also, according to one embodiment of the fuel gas supply system of an LNG carrier of the present invention, the boil-off gas generated in the LNG storage tank is not compressed in a gas state at a high pressure, and thus is not used as fuel gas of the high-pressure gas injection engine.

Additionally, the LNG storage tank used in the fuel gas supply system of an LNG carrier according to embodiments of the present invention may be designed such that it has strength enough to withstand a pressure increase due to the boil-off gas so as to allow the pressure increase due to the boil-off gas generated in the LNG storage tank during the voyage of the LNG carrier.

Further, the fuel gas supply system of an LNG carrier according to embodiments of the present invention may include a boil-off gas reliquefaction apparatus comprising a cold box and a refrigeration system. A heat exchanger is installed in the middle of the fuel gas supply line for compressing the LNG in the LNG storage tank and supplying the compressed LNG as fuel gas to the high-pressure gas injection engine, and the boil-off gas generated in the LNG storage tank exchanges heat with the LNG in the middle of the fuel gas supply line, and thereby is liquefied. Consequently, the boil-off gas reliquefaction apparatus which is additionally installed may be configured to have a small capacity.

As apparent from the above, according to the fuel gas supply system and method of an LNG carrier of embodiments of the present invention, LNG is extracted from an LNG storage tank, compressed at a high pressure, gasified, and supplied to a high-pressure gas injection engine. Consequently, the fuel gas supply system and method have advantages of simplifying the configuration, reducing power requirements, and preventing an excessive pressure increase due to accumulation of boil-off gas in the LNG storage tank, in supplying fuel gas to the high-pressure gas injection engine in an LNG carrier.

Though the present invention has been shown and described herein with references to the specified embodiments, it would be understood that various modifications, variations, and corrections may occur to those skilled in the art, and thus the description and drawings herein should be interpreted by way of illustrative purpose without limiting the scope and spirit of the present invention.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A fuel gas supply system of an LNG transportation vessel, the system comprising:
    an LNG storage tank configured to store LNG;
    a high-pressure gas injection of the LNG vessel;
    a fuel gas supply line connected from the LNG storage tank to the high-pressure gas injection engine;
    a first pump device configured to compress the LNG stored in the LNG storage tank and communicate the compressed LNG downstream along the fuel gas supply line;
    a second pump device in fluid communication with the first pump device to receive the compressed LNG, the second pump device including a high pressure pump installed outside of the LNG storage tank along the fuel gas supply line, the second pump device configured to compress LNG compressed by the first pump, to a high-pressure of 200 to 300 bar, and supply the compressed LNG toward the engine;
    a gasifying device installed downstream of the second pump device along the fuel gas supply line and configured to gasify the compressed LNG: and
    a discharge device configured to discharge from the LNG storage tank, boil-off gas generated in the LNG storage tank.

2. The fuel gas supply system according to claim 1 wherein the gasifying means includes a heater.

3. A method for supplying fuel gas to a high-pressure gas injection engine of an LNG transportation vessel, the method comprising:
    compressing LNG stored in an LNG storage tank of the LNG carrier by a first pump and communicating the compressed LNG along a fuel supply line to a second pump:
    compressing the compressed LNG by the second pump to meet the pressure requirements of the high-pressure gas injection engine of 200-300 bar, the second pump being a high pressure pump and installed outside of the LNG storage tank:
    gasifying the compressed LNG;
    supplying the gasified LNG to the high-pressure gas injection engine; and
    discharging from the LNG storage tank, boil-off gas generated in the LNG storage tank.

4. The method according to claim 3 wherein gasifying the compressed LNG includes heating the compressed LNG.

* * * * *

UNITED STATES PATENT AND TRADEMARK OFFICE
CERTIFICATE OF CORRECTION

PATENT NO. : 7,690,365 B2  Page 1 of 1
APPLICATION NO. : 12/332733
DATED : April 6, 2010
INVENTOR(S) : Jung Han Lee et al.

It is certified that error appears in the above-identified patent and that said Letters Patent is hereby corrected as shown below:

Column 6
Line 16, "to gasify the compressed LNG: and" should read,
--to gasify the compressed LNG; and--.

Column 6
Line 28, "pump:" should read, --pump;--.

Column 6
Line 33, "storage tank:" should read, --storage tank;--.

Signed and Sealed this

Ninth Day of November, 2010

David J. Kappos
*Director of the United States Patent and Trademark Office*